United States Patent
Sagar (10) Patent No.: US 11,734,265 B1
(45) Date of Patent: Aug. 22, 2023

(54) AUTOMATIC GRAPHQL DATA SOURCE FIELD CHANGE HANDLER

(71) Applicant: salesforce.com, inc., San Francisco, CA (US)

(72) Inventor: Gaurav Sagar, San Francisco, CA (US)

(73) Assignee: SALESFORCE, INC., San Francisco, CA (US)

(*) Notice: Subject to any disclaimer, the term of this patent is extended or adjusted under 35 U.S.C. 154(b) by 0 days.

(21) Appl. No.: 17/689,601

(22) Filed: Mar. 8, 2022

(51) Int. Cl.
G06F 16/00 (2019.01)
G06F 16/242 (2019.01)
G06F 16/25 (2019.01)

(52) U.S. Cl.
CPC ........ G06F 16/2448 (2019.01); G06F 16/252 (2019.01)

(58) Field of Classification Search
CPC .. G06F 16/24556; G06F 9/547; G06F 16/213; G06F 16/2452; G06F 16/258; G06F 16/9024
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |

(Continued)

OTHER PUBLICATIONS

"Google Plus Users", Google+Ripples; Oct. 31, 2011; 3 pages.

*Primary Examiner* — Cheryl Lewis
(74) *Attorney, Agent, or Firm* — Schwabe Williamson & Wyatt (57) ABSTRACT

A GraphQL server stores schemas for GraphQL APIs in a schema store, the schemas defining operations, types and fields of the APIs. Field resolvers are associated with the fields of the APIs to specify which of the data source is to be used to fulfill an API query request. When an event is detected that makes changes to a schema of any of the data sources, the schema store is accessed and an old field name is automatically replaced with a new field name in both the retrieved schemas and the field resolvers mapped to the retrieved schemas. Responsive to receiving an API request, it is determined whether the request has any field names that do not match the corresponding schema, and if so, the old field name is replaced with the new field name in the request.

25 Claims, 4 Drawing Sheets

(56) References Cited

U.S. PATENT DOCUMENTS

| | | |
|---|---|---|
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatteqee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0030689 A1* | 2/2012 | Li .................... G06F 9/541 |
| | | 719/318 |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |

(56) References Cited

U.S. PATENT DOCUMENTS

| | | | |
|---|---|---|---|
| 2013/0007773 A1* | 1/2013 | Guilford | G06F 9/541 |
| | | | 719/328 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0359537 A1 | 12/2014 | Jackobson et al. | |
| 2017/0220606 A1* | 8/2017 | Wang | G06N 5/04 |
| 2019/0370370 A1* | 12/2019 | Wittern | G06F 16/24556 |
| 2021/0218773 A1 | 7/2021 | Prakash et al. | |

* cited by examiner

AUTOMATIC GRAPHQL DATA SOURCE FIELD CHANGE HANDLER

TECHNICAL FIELD

One or more implementations relate to the field of application programming interface (API) management and integration; and more specifically, to an automatic GraphQL data source field change handler for GraphQL APIs.

BACKGROUND ART

GraphQL is an open-source data query language for application programming interfaces (APIs), and a runtime for fulfilling queries with existing data. GraphQL includes a type system, query language and execution semantics, static validation, and type introspection. GraphQL APIs connect various data sources and provide a single API endpoint for a client to receive requested data in one API call. GraphQL allows clients to define the structure of the data required, submit requests to a GraphQL server, and the GraphQL server will return the same structure of the data is in response.

All GraphQL APIs have a schema similar to what the RESTful API Modeling Language (RAML) uses to describe RESTful APIs. The schema defines the operations, types and fields of the source data. GraphQL associates a software module referred to as a resolver to each data field that identifies/defines the data source and the data should be fetched for that field. When a GraphQL operation or API request is made by a client, the GraphQL server checks the query payload against the schema for validity and then calls the field resolvers assigned to the fields in the query to fetch the data. The returned data is combined as defined in the schema, and then returned in a response to the client.

When the name of the fields in one of the data sources (e.g., column names, API spec fields) are changed by a database administrator or the API architect, for example, the GraphQL schema no longer matches, causing errors with the resolvers. Even if the GraphQL schema is updated with the new field(s) name, the end customer making the GraphQL API request may not be aware of the new field name(s) and all their requests will continue to receive errors against these fields. The only way to solve for these errors is by rolling back the updates made into the data source, which would then nullify the purpose of why the update was made.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

Figure 1:
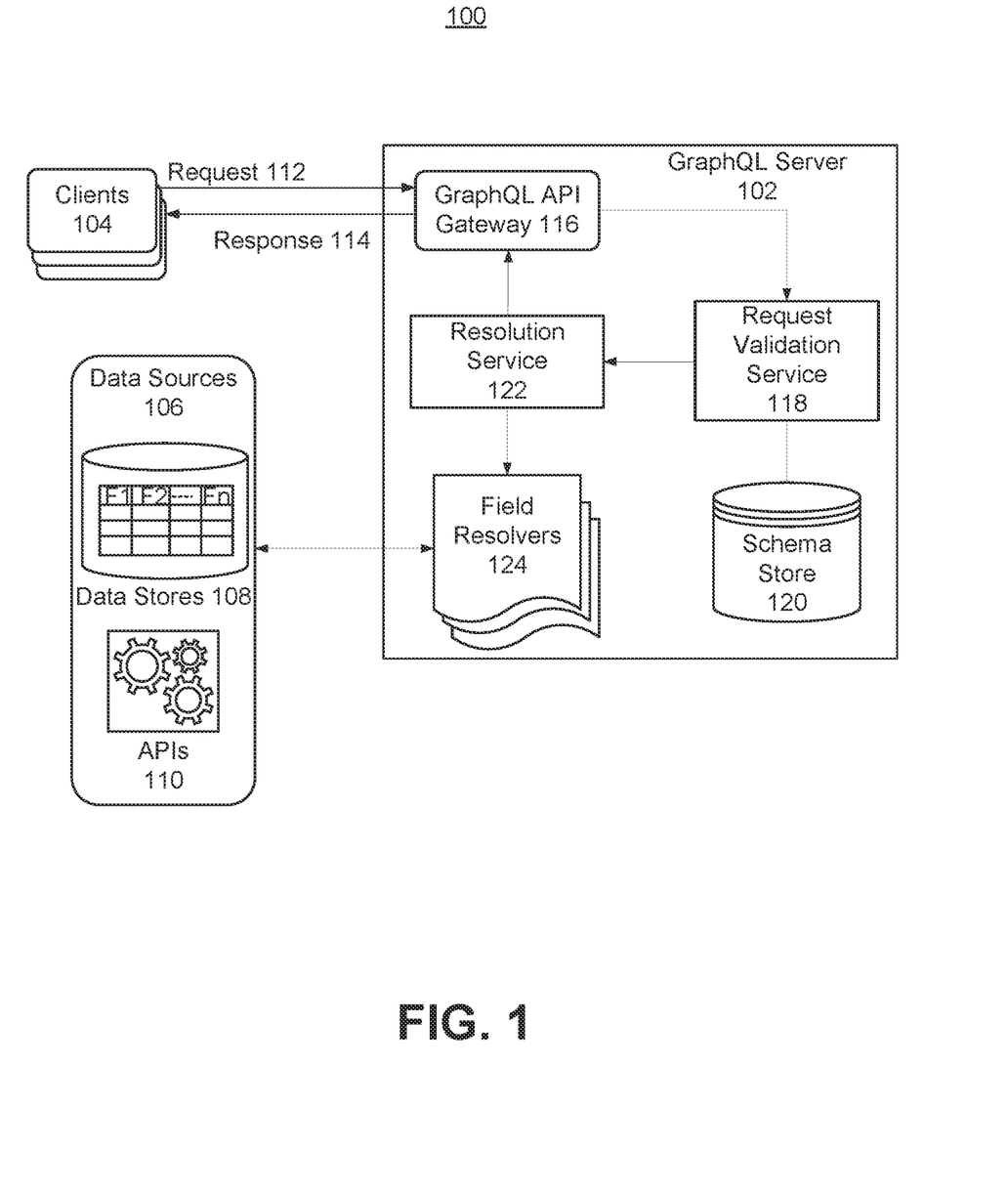
FIG. 1 is an architectural block diagram illustrating a GraphQL system in one implementation.

The following description describes implementations for automatic handling of GraphQL data source field changes. FIG. 1 is an architectural block diagram illustrating a GraphQL system in one implementation. The GraphQL system 100 may include a graphQL server 102 in network communication with a plurality of clients 104 and one or more data sources 106. As used herein a client may be any program executed by a computing device that is capable of obtaining a service provided by another program. In this context a client may be a program configured to initiate an API call to the GraphQL server 102. Additionally or alternatively, a client may refer to the computing device (e.g., a desktop or workstation client, a mobile client, and the like) running the program that initiated the API call to the GraphQL server 102.

As used herein, the GraphQL server 102 may be is a server-side implementation of the GraphQL specification, which is computer hardware or software exposing the data sources 106 that the clients 104 can query for data through a GraphQL API request. As used herein the data sources 106 may store data in the form of data stores 108 (e.g., databases, data lakes, data warehouse, etc.) and APIs 110 (e.g., REST, gRPC, ASYNC, etc.) that are defined with a schema. The data stores 108 and APIs 110 may include column/fields (e.g., F1, F2 . . . Fn) and rows/data objects to store the data. The data sources 106 may be stored local to the clients 104 but more often the data is stored in off-site locations by a cloud provider or a private data center and accessed either through the public internet or a dedicated private network connection.

The GraphQL server 102 may comprise a GraphQL API gateway 116, a request validation service 118, a schema store 120, a resolution service 122, and field resolvers 124. The graphQL API gateway 116 is an API management tool that sits between the clients 104 and backend services of the GraphQL server 102. The GraphQL API gateway 116 accepts GraphQL API query requests 112 from the clients 104, aggregates the various services required to fulfill the queries using the data sources 106, and returns a response 114 to the requesting client 104.

The schema store 120 stores the schemas that are associated with the GraphQL APIs. The GraphQL schemas are the API specification for a GraphQL API that define the operations, data types and fields (similar to API specifications used by RAML and OAS for REST APIs). A respective field resolver 124 is associated with each of the fields of the GraphQL schema and specifies how to fetch the data from a specific data source 106 for that field when requested by the clients 104 in the GraphQL query.

The GraphQL API gateway 116 receives the GraphQL API query requests 112 (also referred to as requests 112) from the clients 104. The requests 112 may comprise query payloads that specify an operation name, the variables and fields whose values are to be retrieved (e.g., an application/JSON content type and a JSON-encoded body). Once received, the GraphQL API gateway 116 sends the request 112 to the validation service 118. The validation service 118 validates the request 112 by retrieving the schema defining the GraphQL API from the schema store 120 and verifying the syntactic structure and field names in the request 112 against the schema. Once the query payload is validated, the validation service 118 calls the resolution service 122, which uses the field resolvers 124 associated with the fields in the query to fetch the data from the corresponding data source 106, combines the retrieved data as defined in the schema, and returns a response 114 to the GraphQL API gateway 116. The GraphQL system 100 works for its intended purpose until someone changes the name of a field in the data source 106 that breaks the field resolvers 124 causing the GraphQL server 102 to respond to the client 104 with errors.

As an example, assume a GraphQL schema defines a data type 'Employee' that has fields {Name, EmpID, DOB} and further assume that a field resolver 124 resolves the query with fields in this data type from a data source 106 comprising an 'Employee' Table in a MySQL database having field/column names {Name, EmpID, DOB}. Essentially each field resolver has logic that maps the field from the GraphQL schema to a field/column name present in the data source 106. Most often the fields in the GraphQL schema saved in the schema store 120 carry the exact same name as present in the underlying data source 106. Since the database administrator (DBA) or the API architect for the data source 106, and the GraphQL API architect are not the same people, it may happen that the DBA or the API architect updates the name of the field(s) in the data source 106. For example, assume the DBA updates the 'Employee' table in the MySQL database and changes the column name 'EmpID' to 'EmployeeId'.

When this happens, it causes errors that will impact end customers as follows. Assume the end customer makes a GraphQL API request 112 that has the field EmpID as one of the fields in the request. The request validation service 118 validates the structure and GraphQL query field names in the request 112 against the GraphQL schema for that GraphQL API. The field resolvers 124 are then called to fetch the data against each of the fields in the payload. When the field resolver for EmpID hits the 'Employee' table to get the value of field 'EmpID', the database returns a 'Column Not Present' error, which is returned in the response 114 to the end customer.

This creates a significant problem as even if an API architect updates the GraphQL schema with the new field(s) name that has been updated in the data source 106, and updates the field resolvers 124 (or is done automatically if using a product like Anypoint DataGraph that automatically writes the resolvers), the end customer making the GraphQL API request through clients 104 is unaware of the new field name(s) and all their requests will keep resulting errors against these fields. This problem can be generalized for other data sources like REST APIs, where an API specification updates the names of object types or fields, which breaks the field resolvers 124 resulting in errors in response to API request 112. The only way to solve for these errors is by rolling back the updates made in the database table or in the API.

The disclosed embodiments provide the GraphQL server with an automatic GraphQL data source field change handler to solve this problem.

Figure 2:
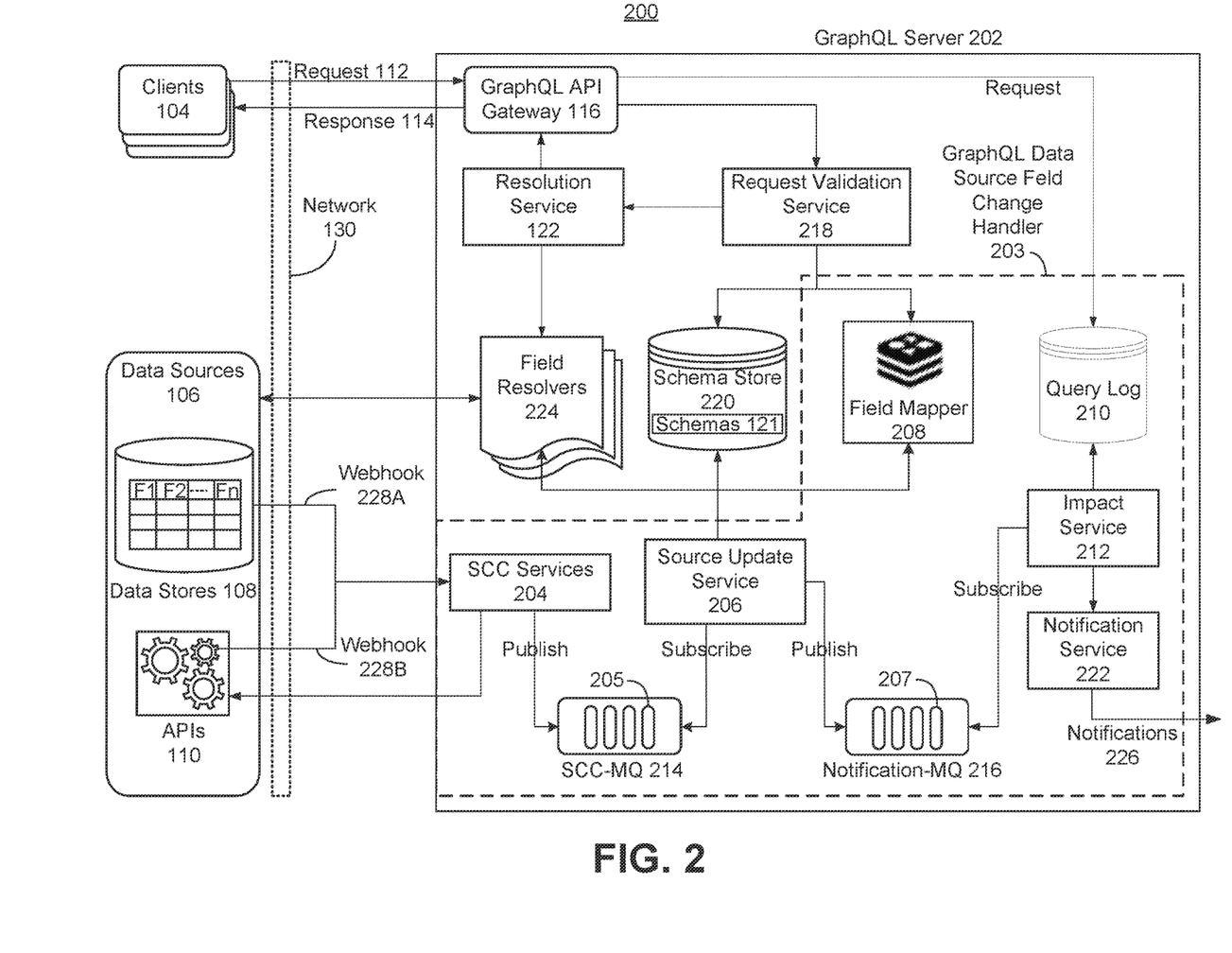
FIG. 2 illustrates a block diagram of an improved GraphQL system in which a GraphQL server executes the GraphQL data source field change handler of the disclosed embodiments.

FIG. 2 illustrates a block diagram of an improved GraphQL system 200 in which a GraphQL server executes the GraphQL data source field change handler 203 of the disclosed embodiments, where like components in FIG. 1 have like reference numerals. According to the disclosed implementations, the GraphQL data source field change handler 203 is capable of automatically detecting changes to the metadata of a data source 106 that is used as input to resolving the fields in a GraphQL API, particularly to the field/column names of a data table and/or the API specification fields, and updates the new field name(s) in both the GraphQL schema 121 and the field resolvers 224 that use the data source 106. In addition, the GraphQL data source field change handler 203 enables an end customer to keep querying the GraphQL server 202 through client 104 with the same GraphQL API query request 112 used prior to the change without receiving errors by automatically updating the metadata in the GraphQL API query request upon receipt. In this implementation, the request validation service 218, the field resolvers 224, and the schema score 220 are provided with new functions compared to the implementation in FIG. 1 and as described further below.

According to the disclosed embodiments, the GraphQL data source field change handler 203 may comprise a schema change capture (SCC) service 204, a source update service 206, a field mapper 208, a query log 210, an impact service 212, a SCC message queue (MQ) 214, a notification MQ 216, and a notification service 222.

The SCC service 204 monitors the data sources 106 for events indicating changes made to a schema 121 of any of the data sources 106 and publishes change messages 205 for the changes to the SCC-MQ 214. Each change message 205 includes a message type (e.g., 'rename', 'delete'), an identifier (ID) of the data source 106, old fields names and replacement fields names. In some implementations there may be one SCC service 204 for each of the data sources 106 used as input.

The source update service 206 subscribes to the SCC-MQ 214 and for each change message 205, retrieves all the GraphQL schemas 121 from the schema store 220 that have field(s) that use the data source 106 to resolve in the field resolver 224, which the change message 205 refers in the data source ID from the message 205. The source update service 206 also publishes the change messages 205 to the notification-MQ 216. The field mapper 208 is a key-value store used by the source update service 206 to store mappings of GraphQL schema IDs to old and new field names.

The query log 210 saves the GraphQL API requests 112 made on a particular GraphQL API 110 by various clients 104 over some predetermined time period (e.g., the last N days/weeks/months). The impact service 212 uses the query log 210 to estimate any potential impact due to change of field names using predefined metrics and to compile a list the client IDs impacted. The notification service 222 creates a notification message 226 containing the estimated metrics and the list of client IDs, and sends the notification message 226 to an admin for the GraphQL API as notification of the potential impact of the field name change.

Figure 3:
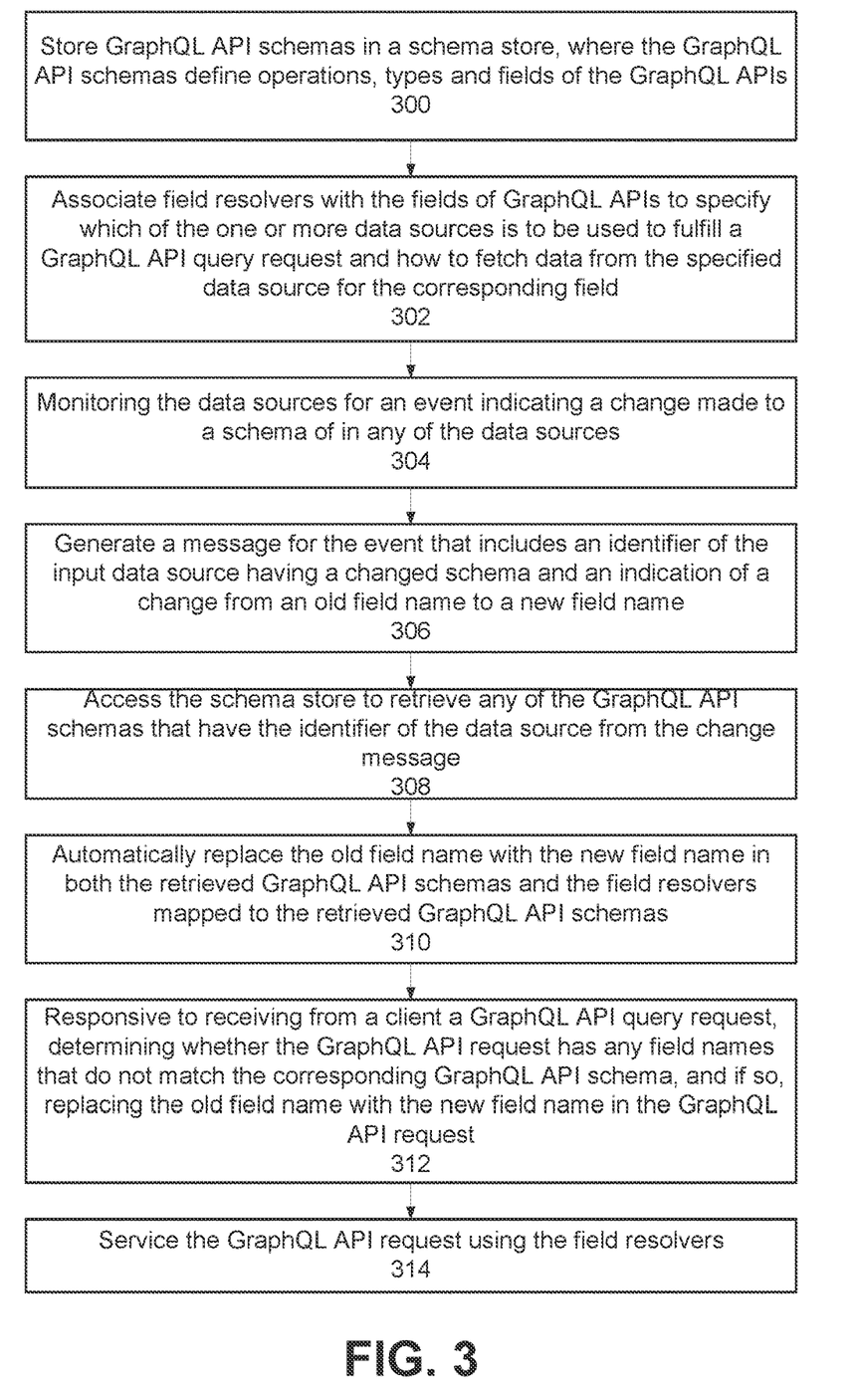
FIG. 3 is a flow diagram illustrating a process for automatically detecting changes to metadata of a data source performed by the GraphQL server enabled by the GraphQL data source field change handler.

FIG. 3 is a flow diagram illustrating a process for automatically detecting changes to metadata of a data source performed by the GraphQL server 202 enabled by the GraphQL data source field change handler 203. The process has two parts, the first part is to automatically identify when a change is made to the fields of a data source(s) 106 and to then update the corresponding fields in the API schemas 121 and in the field resolvers 224. The second part is how to handle when a client 104 makes a GraphQL API request 112 without being aware of the change made to the data source 106.

Part I

Referring to both FIGS. 2 and 3, the process may be performed by one or more processors of the GraphQL server 202 executing code comprising the components therein. The process may begin by storing GraphQL API schemas 121 in a schema store 220, where the GraphQL API schemas 121 define operations, types and fields of the GraphQL APIs 110 (block 300). The field resolvers 224 are associated with the fields of GraphQL APIs to specify which of the one or more data sources 106 is to be used to fulfill a GraphQL API query request and how to fetch data from the specified data source 106 for the corresponding field (block 302).

One or more data sources 106 are monitored for an event indicating a change made to a schema of any of the data sources 106 (block 304). A message is then generated for the event that includes an identifier of the data source having a changed schema and an indication of a change from an old field name to a new field name (block 306). In one implementation, the schema change capture (SCC) service 204 monitors the data sources 106 for events that mark changes made to the schema of any of the input data sources 106 used as inputs and creates change message 205 for each change.

Referring to FIG. 2, in some implementations the SCC service 204 listens for the events using webhooks 228A and 228B (collectively referred to as webhooks 228). A webhook 228 (also called a web callback or HTTP push API) is a method used by applications to provide other applications with real-time information, such as events. The majority of webhooks POST data as JSON or XML to be interpreted, or as a form data.

A trigger is first created for the webhooks. For data stores 108 such as databases, a SQL trigger is created that gets triggered on "ALTER TABLE <Table Name> <RENAME/DROP>" command on any of columns in the data store 108 that map to fields in GraphQL schema 121. The SQL trigger calls the webhook 228A and sends this event as a message through the webhook 228A to the SCC service 204. For APIs 110, a trigger is added in a continuous integration/continuous delivery (CI/CD) pipeline that is triggered when a commit is made to an API specification or a new version of the API specification is published. The trigger provides the SCC service 204 through the webhook 228B with the new API specification that was just deployed in production and the old API specification. The SCC service 204 determines the difference between the new API specification and the old API specification used as the data source 106 to GraphQL schema 121 stored in the schema store 220, and identifies fields whose names have been changed and fields which have been deleted.

In response to receiving a message from a webhook 228, the SCC service 204 generates and publishes a change message 205. Each change message 205 may include an identifier (ID) of the data source 106, an indication of a change from old field names to a new field names, and a change type indication that the event is a field rename or a field delete. One example format for the change messages 205 may be: {Data Source ID, <RENAME/DELETE>, Old Field Name, New Field Name}. The change messages 205 may be implemented as JSON (JavaScript Object Notation) messages as an example.

In one implementation, the SCC service 204 publishes the change messages 205 for storage in the SCC-MQ 214. The SCC-MQ 214 handles retries and stores the change messages 205 until the subscribing source update service 206 fetches the change message 205 successfully. As the GraphQL system 200 may receive many data source 106 field update events through webhook 228A and webhook 228B, queuing of the change messages 205 in the SCC-MQ 214 is done until they are processed to make sure no messages are lost for lack of processing bandwidth.

Referring again to FIG. 3, after the change message 205 is published, the schema store is accessed to retrieve any of the GraphQL API schemas 121 that have the identifier of the input data source from the change message 205 (block 308). In one implementation, the source update service 206 fetches the change messages from the SCC-MQ 214 and uses the data source ID to access the schema store 220 to retrieve any of the GraphQL API schemas 121 with a matching data source ID.

The old field name is then automatically replaced with the new field name in both the retrieved GraphQL API schemas 121 and the field resolvers 224 that are mapped to the retrieved GraphQL's API schemas (block 310). To accomplish this, the source update service 206 may store a mapping between the retrieved GraphQL API schema ID as key, and the old field name and the new field name as values in the field mapper 208 (a key-value store). A hash HMSET command may be used to set the specified fields to their respective values in the hash stored at the key in the field mapper 208. An example HMSET command is: HMSET ('GraphQL API ID', {'old field name1': 'new field name', 'old field name2': 'new field name'})//Hash on API schema ID. The HMSET command overwrites any existing fields in the hash.

Next, the source update service accesses the mappings in the field mapper 208, and for all field resolvers 224 associated with the retrieved GraphQL API schema based on the data source ID, the source update service 206 replaces the old field name with the new field name from the change message 205.

In further implementation, the source update service 206 may also retrieve a URL (universal resource locator) of the GraphQL API 110 corresponding to the retrieved graphQL API schema, and then publishes a message 207 to the notification-MQ 216 containing the GraphQL API URL, the change type indication, and a field list comprising the old field name and the new field name. One example format for the message 207 may be: {GraphQL API URL, <RENAME/DELETE>, Old Field Name, New Field Name}. The query log saves the last N days of API requests 112 made on a GraphQL API by various clients.

Referring again to FIG. 2, in a further aspect of the disclosed embodiments, after the source update service 206 publishes a message 207 in the notification-MQ 216, the impact service 212, which subscribes to the notification-MQ 216, fetches the message 207. The impact service 212 then uses the message 207 to run a query against the query log 210, which saves the API requests 112 made on a particular GraphQL API by various clients 104 to obtain predefined metrics. The impact service 212 estimates the potential impact of due to a field name and identifying the clients 104 impacted by the change using the predefined metrics.

The predefined metrics used may include the % of unique clients impacted and the % of API calls impacted by operation.

The impact service 212 may obtain the metrics by submitting to the query log 210 the example query:
SELECT GraphQLAPI, COUNT(DISTINCT clientId) as clientsImpacted, COUNT(*) as APIcalls
FROM QueryLog
WHERE GraphQLAPI=<GraphQL API mapped to Schema impacted>
AND FieldList~*(fieldname1|fieldname2|fieldnameN)
GROUP BY GraphQLAPI Similarly, the impact service 212 may obtain list of clients 104 impacted metrics by submitting to the query log 210 the example query:
SELECT clientID
FROM QueryLog
WHERE GraphQLAPI=<GraphQL API mapped to Schema impacted>
AND FieldList~*(fieldname1|fieldname2|fieldnameN)
GROUP BY clientID After obtaining the estimated metrics on the potential impact of a field(s) name change, the impact service 212 invokes the notification service 222 and passes along the estimated metrics. The notification service 222 retrieves the contact information of an administrator, such as GraphQL API architect, of the schema 121 and electronically sends a notification message 226 with the estimated metrics on communication channels, such as text, email or a chat service.

Part II

Referring to both FIGS. 2 and 3, responsive to receiving from a client a GraphQL API query request 112 without being aware of the change made to the data source 106, the GraphQL server 202 determines whether the GraphQL API request 112 has any field names that do not match the corresponding GraphQL API schema 121, and if so, replaces the old field name with the new field name in the GraphQL API request 112 (block 312). In one implementation, GraphQL API request 112 is passed to the request validation service 218, which determines whether the GraphQL API request 112 has any field names that do not match the corresponding GraphQL API schema 121 by comparing field names from the GraphQL API request 112 to the field names in the corresponding GraphQL API schema 121 from the schema store 220.

The graphQL API request is then serviced using the field resolvers 224 (block 314). The GraphQL API gateway 116 successfully sends the response 114 back to the client 104 and saves the request-response pair in the query log 210.

More specifically, the request validation service 218 inspects the payload of the API request 112 and checks if the operation(s) are valid as per the schema 121 in the schema store 220 corresponding to the GraphQL API ID. If the request validation service 218 determines that some fields names in the request payload don't match the schema 121 (e.g., the fields in query are the old field names and the schema has new field names), the request validation service 218 looks up the new field names in the field mapper 208, which stores the mapping of old field names and new field names as values and an identifier of the GraphQL API as a key. The request validation service 218 then updates the payload of the API request 112 to add an 'alias' for the fields whose names have been updated by using new field values from field mapper 208. The alias is set to the field's old name (before the colon), e.g., Employee {Name, EmpID, DOB} to Employee {Name, EmpID: EmployeeId, DOB}. The request validation service 218 passes the updated API request to the resolution service 122, which knows all the field resolvers 224 mapped to the various fields in the API request. The resolution service 122 takes in the updated API request and calls the field resolvers 224 assigned to the respective fields in the updated API request. Since the original field in the updated API request has been made the alias, the field resolver 224 is called on the new field name and it is able to fetch the corresponding field name from the data source 106. The request validation service 218 collects the field values obtained by the field resolver 224 from the data source 106 and returns as response to the GraphQL API gateway 116.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 4A:
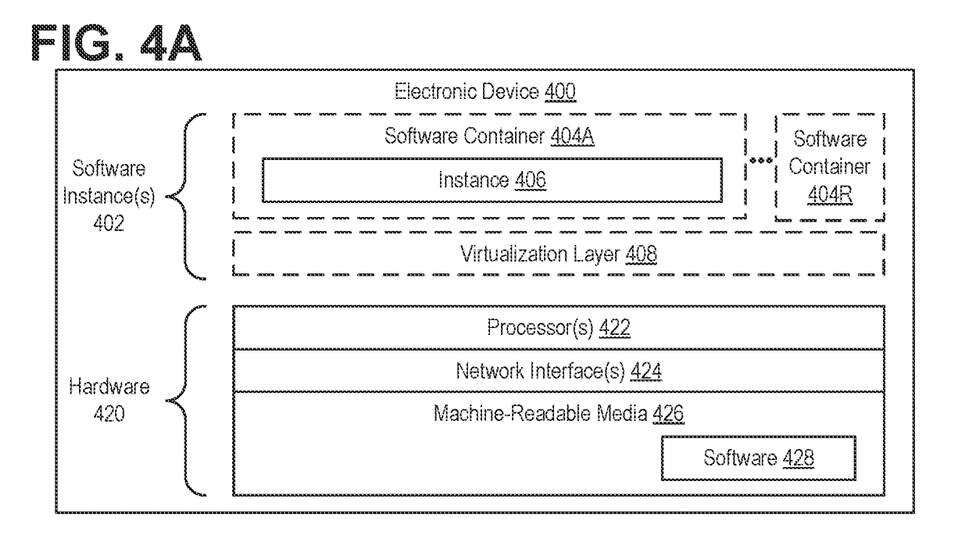
FIG. 4A is a block diagram illustrating an electronic device according to some example implementations.

FIG. 4A is a block diagram illustrating an electronic device 400 according to some example implementations. FIG. 4A includes hardware 420 comprising a set of one or more processor(s) 422, a set of one or more network interfaces 424 (wireless and/or wired), and machine-readable media 426 having stored therein software 428 (which includes instructions executable by the set of one or more processor(s) 422). The machine-readable media 326 may include non-transitory and/or transitory machine-readable media. Each of the previously described clients and the automatic GraphQL data source field change handler service may be implemented in one or more electronic devices 400. In one implementation: 1) each of the clients is implemented in a separate one of the electronic devices 400 (e.g., in end user devices where the software 428 represents the software to implement clients to interface directly and/or indirectly with the automatic GraphQL data source field change handler service (e.g., software 428 represents a web browser, a native client, a portal, a command-line interface, and/or an application programming interface (API) based upon protocols such as Simple Object Access Protocol (SOAP), Representational State Transfer (REST), etc.)); 2) the automatic GraphQL data source field change handler service is implemented in a separate set of one or more of the electronic devices 400 (e.g., a set of one or more server devices where the software 428 represents the software to implement the automatic GraphQL data source field change handler service); and 3) in operation, the electronic devices implementing the clients and the automatic GraphQL data source field change handler service would be communicatively coupled (e.g., by a network) and would establish between them (or through one or more other layers and/or or other services) connections for submitting GraphQL API request to the automatic GraphQL data source field change handler service and returning a response to the clients. Other configurations of electronic devices may be used in other implementations (e.g., an implementation in which the client and the automatic GraphQL data source field change handler service are implemented on a single one of electronic device 400).

During operation, an instance of the software 428 (illustrated as instance 408 and referred to as a software instance; and in the more specific case of an application, as an application instance) is executed. In electronic devices that use compute virtualization, the set of one or more processor(s) 422 typically execute software to instantiate a virtualization layer '308 and one or more software container(s) 404A-304R (e.g., with operating system-level virtualization, the virtualization layer '308 may represent a container engine (such as Docker Engine by Docker, Inc. or rkt in Container Linux by Red Hat, Inc.) running on top of (or integrated into) an operating system, and it allows for the creation of multiple software containers 404A-304R (representing separate user space instances and also called virtualization engines, virtual private servers, or jails) that may each be used to execute a set of one or more applications; with full virtualization, the virtualization layer '308 represents a hypervisor (sometimes referred to as a virtual machine monitor (VMM)) or a hypervisor executing on top of a host operating system, and the software containers 404A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 428 is executed within the software container 404A on the virtualization layer '308. In electronic devices where compute virtualization is not used, the instance 408 on top of a host operating system is executed on the "bare metal" electronic device 400. The instantiation of the instance 408, as well as the virtualization layer '308 and software containers 404A-304R if implemented, are collectively referred to as software instance(s) 402.

Alternative implementations of an electronic device may have numerous variations from that described above. For example, customized hardware and/or accelerators might also be used in an electronic device.

Example Environment

Figure 4B:
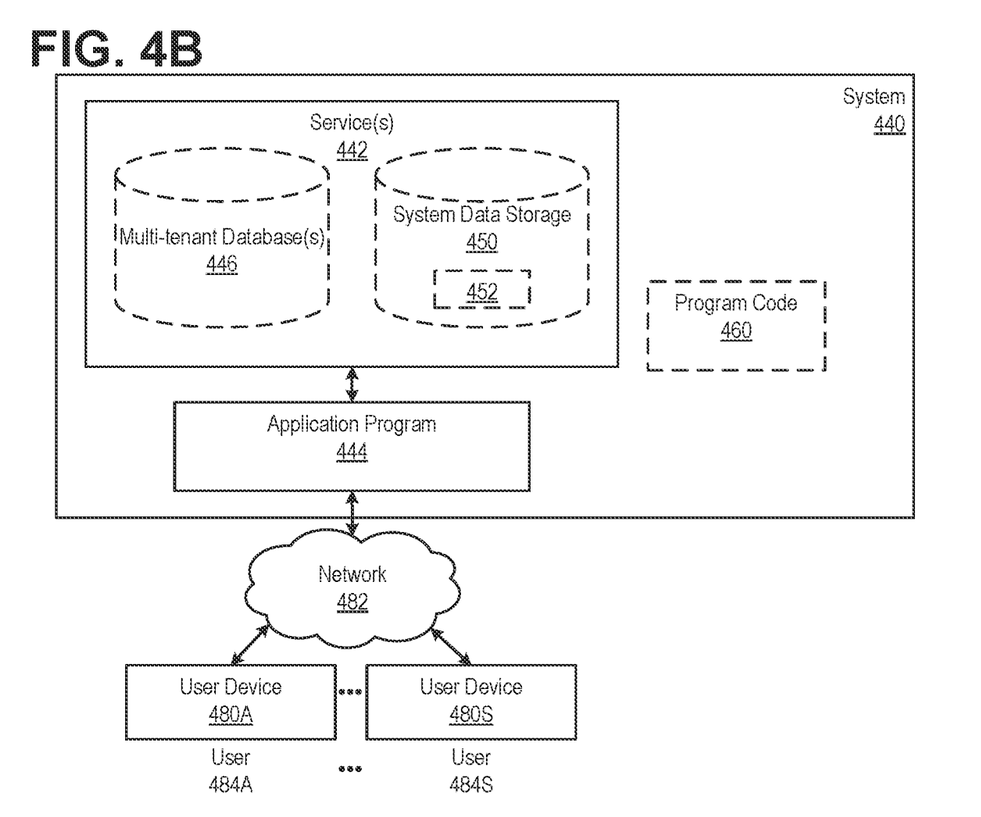
FIG. 4B is a block diagram of a deployment environment according to some example implementations.

FIG. 4B is a block diagram of a deployment environment according to some example implementations. A system 440 includes hardware (e.g., a set of one or more server devices) and software to provide service(s) 442, including the automatic GraphQL data source field change handler service. In some implementations the system 440 is in one or more datacenter(s). These datacenter(s) may be: 1) first party datacenter(s), which are datacenter(s) owned and/or operated by the same entity that provides and/or operates some or all of the software that provides the service(s) 442; and/or 2) third-party datacenter(s), which are datacenter(s) owned and/or operated by one or more different entities than the entity that provides the service(s) 442 (e.g., the different entities may host some or all of the software provided and/or operated by the entity that provides the service(s) 442). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 440 is coupled to user devices 480A-380S over a network 482. The service(s) 442 may be on-demand services that are made available to one or more of the users 484A-384S working for one or more entities other than the entity which owns and/or operates the on-demand services (those users sometimes referred to as outside users) so that those entities need not be concerned with building and/or maintaining a system, but instead may make use of the service(s) 442 when needed (e.g., when needed by the users 484A-384S). The service(s) 442 may communicate with each other and/or with one or more of the user devices 480A-380S via one or more APIs (e.g., a REST API). In some implementations, the user devices 480A-380S are operated by users 484A-384S, and each may be operated as a client device and/or a server device. In some implementations, one or more of the user devices 480A-380S are separate ones of the electronic device 400 or include one or more features of the electronic device 400.

In some implementations, the system 440 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 440 is a multi-tenant cloud computing architecture supporting multiple services, such as one or more of the following types of services: Automatic GraphQL data source field change handler service 442, API management; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 440 may include an application platform 444 that enables PAAS for creating, managing, and executing one or more applications developed by the provider of the application platform 444, users accessing the system 440 via one or more of user devices 480A-380S, or third-party application developers accessing the system 440 via one or more of user devices 480A-380S.

In some implementations, one or more of the service(s) 442 may use one or more multi-tenant databases 446, as well as system data storage 450 for system data 452 accessible to system 440. In certain implementations, the system 440 includes a set of one or more servers that are running on server electronic devices and that are configured to handle requests for any authorized user associated with any tenant (there is no server affinity for a user and/or tenant to a specific server). The user devices 480A-380S communicate with the server(s) of system 440 to request and update tenant-level data and system-level data hosted by system 440, and in response the system 440 (e.g., one or more servers in system 440) automatically may generate one or more Structured Query Language (SQL) statements (e.g., one or more SQL queries) that are designed to access the desired information from the multi-tenant database(s) 446 and/or system data storage 450.

In some implementations, the service(s) 442 are implemented using virtual applications dynamically created at run time responsive to queries from the user devices 480A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 460 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 444 includes an application setup mechanism that supports application developers' creation and management of applications, which may be saved as metadata by save routines. Invocations to such applications, including the automatic graphQL data source field change handler service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 482 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 4th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 440 and the user devices 480A-380S.

Each user device 480A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 440. For example, the user interface device can be used to access data and applications hosted by system 440, and to perform searches on stored data, and otherwise allow one or more of users 484A-384S to interact with various GUI pages that may be presented to the one or more of users 484A-384S. User devices 480A-380S might communicate with system 440 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 480A-380S might include an HTTP client, commonly referred to as a "browser," for sending and receiving HTTP messages to and from server(s) of system 440, thus allowing users 484A-384S of the user devices 480A-380S to access, process and view information, pages and applications available to it from system 440 over network 482.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method for API management by a GraphQL server, comprising:
    storing GraphQL APIs and corresponding GraphQL API schemas in a schema store, where the GraphQL API schemas define operations, types and fields of the GraphQL APIs;
    associating field resolvers with the fields of the GraphQL APIs to specify which of one or more data sources is to be used to fulfill a GraphQL API query request and how to fetch data from the specified data source for the corresponding field;

monitoring the one or more data sources for an event indicating a change made to a schema of any of the data sources;

generating a message for the event that includes an identifier of the data source having a changed schema and an indication of a change from an old field name to a new field name;

accessing the schema store and retrieving any of the GraphQL API schemas that have the identifier of the data source from the message;

automatically replacing the old field name with the new field name in both the retrieved GraphQL API schemas and the field resolvers mapped to the retrieved GraphQL API schemas;

responsive to receiving from a client a GraphQL API request, determining whether the GraphQL API request has any field names that do not match a corresponding GraphQL API schema, and if so, replacing the old field name with the new field name in the GraphQL API request; and servicing the GraphQL API request using the field resolvers.

2. The method of claim 1, wherein monitoring the one or more data sources for the event further comprises using a webhook to listen for the events, and creating a first trigger or a second trigger for the webhook, the first trigger is created for a data store and is triggered on an alter table command, and the second trigger that is added in a continuous integration/continuous delivery (Cl/CD) pipeline is created for an API and is triggered when a commit is made to an API specification or a new version of the API specification is published.

3. The method of claim 1, wherein generating the message for the event further comprises: providing a message with a change type indication that the event is a field rename or a field delete.

4. The method of claim 1, further comprising wherein generating a message for the event further comprises: publishing the message to a first message queue.

5. The method of claim 1, wherein accessing the schema store and retrieving any of the GraphQL API schemas that have the identifier of the data source from the message further comprises: fetching and a first message from a message queue.

6. The method of claim 5, wherein replacing the old field name with the new field name in field resolvers mapped to the GraphQL schemas further comprises:

storing a mapping of a GraphQL API ID as a key and the old field name and a new field name as values; and accessing the mapping, and for the field resolvers associated with the retrieved GraphQL schemas based on the identifier of the data source, replacing the old field name with the new field name from the message.

7. The method of claim 6, wherein replacing the old field name with the new field name in field resolvers mapped to the GraphQL schemas further comprises:

retrieving a URL (universal resource locator) of the GraphQL API corresponding to the retrieved GraphQL API schema, and publishing a second message to a notification queue, the second message containing the GraphQL API URL, a change type indication, and a field list comprising the old field name and the new field name.

8. The method of claim 7, further comprising:

saving in a query log any API requests made on a particular GraphQL API by various clients;

fetching the second message from the notification queue and using the second message to run a query against the query log to obtain predefined metrics, and estimating a potential impact of due to a field name change and identifying clients impacted by the change using the predefined metrics.

9. The method of claim 8, further comprising using as the predefined metrics a percentage of unique clients impacted and a percentage of API calls impacted.

10. The method of claim 1, further comprising:

estimating metrics on a potential impact due to a field name change and identifying clients impacted by the change; and electronically sending the estimated metrics and the identified clients to an administrator on communication channels, including chat service, text or email.

11. The method of claim 1, wherein determining whether the GraphQL API request has any field names that do not match the corresponding GraphQL API schema, and if so, replacing the old field name with the new field name in the GraphQL API request.

12. The method of claim 11, wherein replacing the old field name with the new field name in the GraphQL API request further comprises:

looking up the new field names in a field mapper that stores a mapping of the old field names and new field names as values and an identifier of the GraphQL API as a key;

updating a payload of the GraphQL API request to add an alias for the old fields whose names have been updated by using new field values from field mapper to create an updated API request; and invoking the field resolvers assigned to respective fields in the updated API request based on the new names.

13. A non-transitory machine-readable storage medium that provides instructions that, if executed by a processor are configurable to cause said processor to perform operations comprising:

storing GraphQL APIs and corresponding GraphQL API schemas in a schema store, where the GraphQL API schemas define operations, types and fields of the GraphQL APIs associating field resolvers with the fields of the GraphQL APIs to specify which of one or more data sources is to be used to fulfill a GraphQL API query request and how to fetch data from the specified data source for the corresponding field;

monitoring the one or more data sources for an event indicating a change made to a schema of any of the data sources;

generating a message for the event that includes an identifier of the data source having a changed schema and an indication of a change from an old field name to a new field name;

accessing the schema store and retrieving any of the GraphQL API schemas that have the identifier of the data source from the message;

automatically replacing the old field name with the new field name in both the retrieved GraphQL API schemas and the field resolvers mapped to the retrieved GraphQL API schemas;

responsive to receiving from a client a GraphQL API request, determining whether the GraphQL API request has any field names that do not match the corresponding GraphQL API schema, and if so, replacing the old field name with the new field name in the GraphQL API request; and servicing the GraphQL API request using the field resolvers.

14. The non-transitory machine-readable storage medium of claim 13, wherein monitoring the one or more data sources for the event further comprises using a webhook to listen for the events, and creating a first trigger or a second trigger for the webhook, the first trigger is created for a data store and is triggered on an alter table command, and the second trigger that is added in a continuous integration/continuous delivery (CI/CD) pipeline is created for an API and is triggered when a commit is made to an API specification or a new version of the API specification is published.

15. The non-transitory machine-readable storage medium of claim 13, wherein generating the message for the event further comprises: providing a message with a change type indication that the event is a field rename or a field delete.

16. The non-transitory machine-readable storage medium of claim 13, further comprising wherein generating a message for the event further comprises: publishing the message to a first message queue.

17. The non-transitory machine-readable storage medium of claim 13, wherein accessing the schema store and retrieving any of the GraphQL API schemas that have the identifier of the data source from the message further comprises: fetching and a first message from a message queue.

18. The non-transitory machine-readable storage medium of claim 17, wherein replacing the old field name with the new field name in field resolvers mapped to the GraphQL schemas further comprises:
storing a mapping of a GraphQL API ID as a key and the old field name and a new field name as values; and
accessing the mapping, and for the field resolvers associated with the retrieved GraphQL schemas based on the identifier of the data source, replacing the old field name with the new field name from the message.

19. The non-transitory machine-readable storage medium of claim 18, wherein replacing the old field name with the new field name in field resolvers mapped to the GraphQL schemas further comprises:
retrieving a URL (universal resource locator) of the GraphQL API corresponding to the retrieved GraphQL API schema, and
publishing a second message to a notification queue, the second message containing the GraphQL API URL, a change type indication, and a field list comprising the old field name and the new field name.

20. The non-transitory machine-readable storage medium of claim 19, further comprising:
saving in a query log any API requests made on a particular GraphQL API by various clients;
fetching the second message from the notification queue and using the second message to run a query against the query log to obtain predefined metrics, and
estimating a potential impact of due to a field name change and identifying clients impacted by the change using the predefined metrics.

21. The non-transitory machine-readable storage medium of claim 20, further comprising using as the predefined metrics a percentage of unique clients impacted and a percentage of API calls impacted.

22. A GraphQL server comprising:
a non-transitory machine-readable storage medium that provides instructions that, if executed by a set of one or more processors, are configurable to cause the set of processors to perform operations comprising,
storing GraphQL APIs and corresponding GraphQL API schemas in a schema store, where the GraphQL API schemas define operations, types and fields of the GraphQL APIs;
associating field resolvers with the fields of the GraphQL APIs to specify which of a one or more data sources is to be used to fulfill a GraphQL API query request and how to fetch data from the specified data source for the corresponding field;
monitoring the one or more data sources for an event indicating a change made to a schema of any of the data sources;
generating a message for the event that includes an identifier of the data source having a changed schema and an indication of a change from an old field name to a new field name;
accessing the schema store and retrieving any of the GraphQL API schemas that have the identifier of the data source from the message;
automatically replacing the old field name with the new field name in both the retrieved GraphQL API schemas and the field resolvers mapped to the retrieved GraphQL API schemas;
responsive to receiving from a client a GraphQL API request, determining whether the GraphQL API request has any field names that do not match the corresponding GraphQL API schema, and if so, replacing the old field name with the new field name in the GraphQL API request; and
servicing the GraphQL API request using the field resolvers.

23. The GraphQL server of claim 22, further comprising:
estimating metrics on a potential impact due to a field name change and identifying clients impacted by the change; and
electronically sending the estimated metrics and the identified clients to an administrator on communication channels, including chat service, text or email.

24. The GraphQL server of claim 22, wherein determining whether the GraphQL API request has any field names that do not match the corresponding GraphQL API schema, and if so, replacing the old field name with the new field name in the GraphQL API request.

25. The GraphQL server of claim 24, wherein replacing the old field name with the new field name in the GraphQL API request further comprises:
looking up the new field names in a field mapper that stores a mapping of the old field names and new field names as values and an identifier of the GraphQL API as a key;
updating a payload of the GraphQL API request to add an alias for the old fields whose names have been updated by using new field values from field mapper to create an updated API request; and
invoking the field resolvers assigned to respective fields in the updated API request based on the new names.

* * * * *